(12) United States Patent
Kim

(10) Patent No.: US 7,532,707 B2
(45) Date of Patent: May 12, 2009

(54) CALL ERROR PREVENTION

(75) Inventor: Duck-Sung Kim, Incheon (KR)

(73) Assignee: LG Electronics, Inc., Seoul (KR)

( * ) Notice: Subject to any disclaimer, the term of this patent is extended or adjusted under 35 U.S.C. 154(b) by 562 days.

(21) Appl. No.: 10/799,901

(22) Filed: Mar. 12, 2004

(65) Prior Publication Data

US 2004/0179673 A1    Sep. 16, 2004

(30) Foreign Application Priority Data

Mar. 12, 2003    (KR)    ........................ 10-2003-0015495

(51) Int. Cl.
    *H04M 11/04*    (2006.01)
(52) U.S. Cl. ...................... 379/37; 379/45; 379/207.11; 379/210.01
(58) Field of Classification Search .... 379/351–357.01, 379/37; 455/404.01
    See application file for complete search history.

(56) References Cited

U.S. PATENT DOCUMENTS

| | | | |
|---|---|---|---|
| 4,682,357 A | 7/1987 | Irino | ........................ 379/356 |
| 5,157,719 A * | 10/1992 | Waldman | ............... 379/355.05 |
| 5,339,357 A | 8/1994 | Sawamura et al. | .......... 378/355 |
| 5,355,406 A | 10/1994 | Chencinski et al. | |
| 5,684,873 A | 11/1997 | Tiilikainen | |
| 6,073,005 A * | 6/2000 | Raith et al. | ............... 455/404.1 |
| 6,310,948 B1 * | 10/2001 | Nemeth | .................. 379/213.01 |
| 6,721,418 B1 * | 4/2004 | Yun | ....................... 379/355.01 |
| 6,741,835 B2 * | 5/2004 | Pulver | ........................ 455/3.05 |
| 6,760,432 B1 * | 7/2004 | Wong et al. | ............. 379/356.01 |
| 6,775,538 B2 * | 8/2004 | Forbes et al. | ............. 455/414.1 |
| 6,870,927 B1 * | 3/2005 | Theis | ..................... 379/355.01 |
| 6,980,642 B1 * | 12/2005 | Hung et al. | ............. 379/355.05 |
| 7,006,614 B2 * | 2/2006 | Feinberg et al. | ............. 379/164 |
| 2001/0047263 A1 | 11/2001 | Smith et al. | .................. 704/275 |
| 2003/0231759 A1 * | 12/2003 | Bedingfield et al. | ..... 379/355.01 |
| 2004/0052355 A1 * | 3/2004 | Awada et al. | .......... 379/355.01 |

FOREIGN PATENT DOCUMENTS

| | | |
|---|---|---|
| JP | 2001-024774 | 1/2001 |
| WO | WO99/31856 | 6/1999 |
| WO | WO 01/41458 A2 | 6/2001 |

* cited by examiner

*Primary Examiner*—Alexander Jamal
(74) *Attorney, Agent, or Firm*—Lee, Hong, Degerman, Kang & Waimey

(57) ABSTRACT

A call error prevention method comprises the steps of inputting a call number, checking whether the input number is a recognizable call service code, determining whether the input number contains the same number of digits as a recognized call service code, and generating an input error warning if the input number does not contain the same number of digits as the recognized call service code.

10 Claims, 4 Drawing Sheets

CALL ERROR PREVENTION

CROSS REFERENCE TO RELATED ART

This application claims the benefit of Korean Patent Application No. 10-2003-0015495, filed on Mar. 12, 2003, which is incorporated herein by reference in its entirety.

FIELD OF THE INVENTION

The present invention relates generally to the field of communications, and more particularly to call error prevention using a communication unit.

BACKGROUND OF THE INVENTION

As mobile communication units become smaller and lighter, users find it increasingly difficult to input correctly telephone numbers via the ever decreasing in size mobile communication unit keypad. Furthermore, public telephone systems are programmed to automatically recognize specific telephone service codes such as "411" (telephone information), "611" (telephone repair), or the like in the United States, as well as general emergency call numbers such as "911" in the United States or "119" in South Korea, respectively, during telephone input.

As a result, if a user in South Korea were to attempt, for example, to make a telephone call to 011-9876-5432 via a mobile communication unit, by erroneously dialing 119-876-5432, i.e. failing to dial the first "0" digit, the mobile communication unit would automatically ignore the rest of the input digits after "119" and place an unsolicited call to the "119" general emergency call center.

A similar result would occur in the United States, if a user were to dial, for example, by mistake 911-609-2345 instead of 1-911-609-2345. In this case, since the input "911" is not a valid area code, but is a valid general emergency call number, the public telephone system automatically places an unwarranted call to the nearest general emergency call center. If the first three digits after a missed "1" in the United States are not recognized as either a valid area code or a valid emergency call number by the public telephone system, the system is programmed to generate an appropriate input error warning to the user.

No method or system for preventing call errors of this type is known in the prior art.

SUMMARY OF THE INVENTION

In accordance with one aspect of the present invention, a call error prevention method comprises the steps of inputting a call number, checking whether the input number is a recognizable call service code, determining whether the input number contains the same number of digits as a recognized call service code, and generating an input error warning if the input number does not contain the same number of digits as the recognized call service code.

In accordance with another aspect of the present invention, a call error prevention method comprises the steps of inputting a call number, checking whether the input number is a recognizable call service code, determining whether the input number contains the same number of digits as a recognized call service code, generating an input error warning if the input number does not contain the same number of digits as the recognized call service code, and checking whether a call is to be placed using the recognized call service code.

In accordance with yet another aspect of the present invention, a call error prevention method comprises the steps of inputting a call number, checking whether the input number is a recognizable emergency call number, determining whether the input number contains the same number of digits as a recognized emergency call number, generating an input error warning if the input number does not contain the same number of digits as the recognized emergency call number, and checking whether a call is to be placed using the recognized emergency call number.

In accordance with still another aspect of the present invention, a communication unit is adapted to check an input call number against a store of recognizable call service codes, determine whether the input number contains the same number of digits as a recognized call service code, and generate an input error warning if there is a mismatch in the number of digits between the input number and the recognized call service code.

In accordance with a different aspect of the present invention, a communication unit is adapted to check an input call number against a store of recognizable call service codes, determine whether the input number contains the same number of digits as a recognized call service code, generate an input error warning if there is a mismatch in the number of digits between the input number and the recognized call service code, and check whether a call is to be placed using the recognized call service code.

In accordance with a still different aspect of the present invention, a communication unit is adapted to check an input call number against a store of recognizable emergency call numbers, determine whether the input number contains the same number of digits as a recognized emergency call number, generate an input error warning if there is a mismatch in the number of digits between the input number and the recognized emergency call number, and check whether a call is to be placed using the recognized emergency call number.

These and other aspects of the present invention will become apparent from a review of the accompanying drawings and the following detailed description of the present invention.

BRIEF DESCRIPTION OF THE DRAWINGS

The present invention is generally shown by way of reference to the accompanying drawings as follows.

DETAILED DESCRIPTION OF THE PREFERRED EMBODIMENTS

Some embodiments of the present invention will be described in detail with reference to the related drawings of FIGS. 1-4. Additional embodiments, features and/or advantages of the invention will become apparent from the ensuing description or may be learned by practicing the invention.

In the figures, the drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
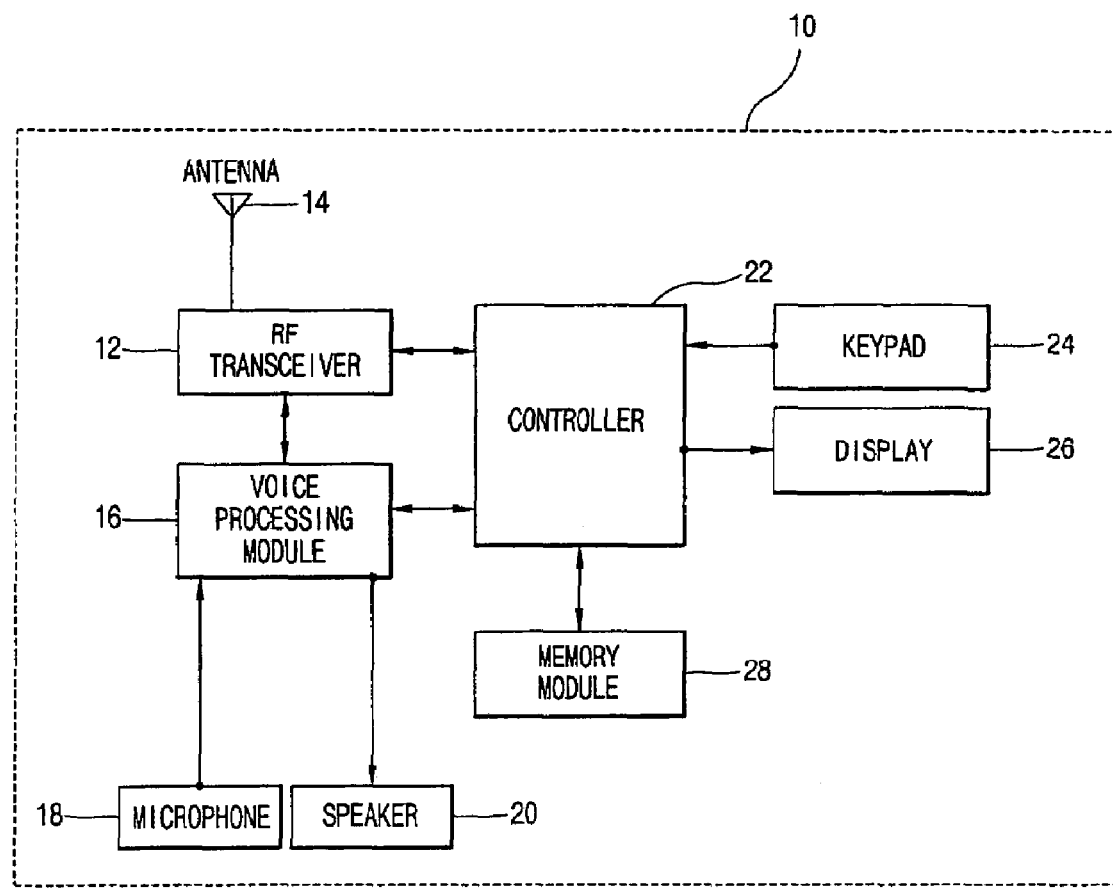
FIG. 1 schematically illustrates a mobile communication unit for use in accordance with the present invention.

FIG. 1 schematically illustrates a mobile communication unit (MCU) 10 comprising a radio frequency (RF) transceiver 12 adapted to operate in a full duplex mode via an antenna 14, a voice processing module (VPM) 16 which receives input from a microphone 18 and generates output via a speaker 20, and a controller 22 which manages the entire operation of MCU 10. Controller 22 receives input from a keypad 24 and generates output via a display 26. Controller 22 is operatively coupled between RF transceiver 12, VPM 16 and a memory module 28 that stores programming needed for operation of MCU 10 as well as user data.

Figure 2:
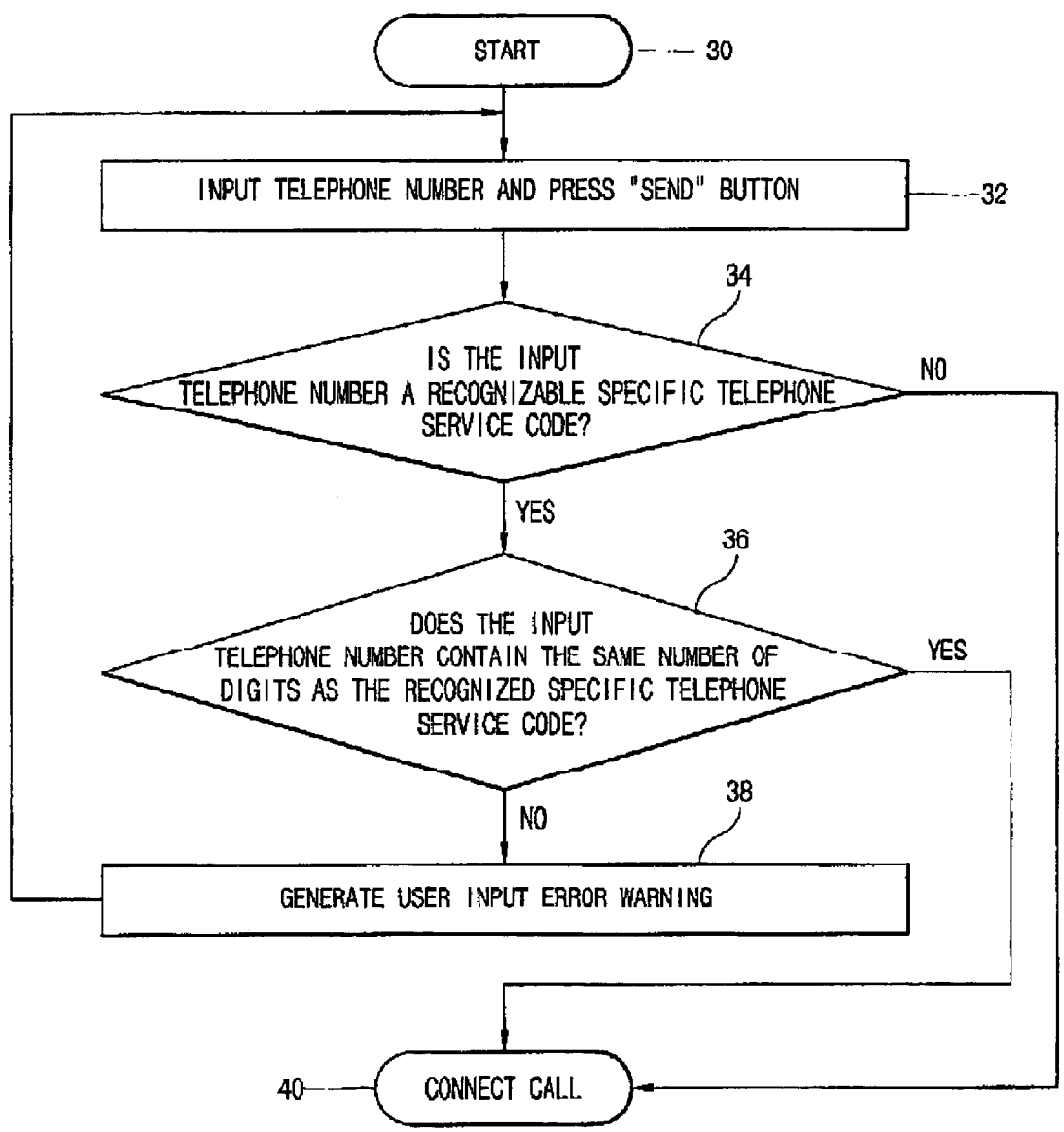
FIG. 2 is a flowchart of a call error prevention method adapted for use in the mobile communication unit of FIG. 1 in accordance with one embodiment of the present invention.

FIG. 2 is a flowchart of a call error prevention method adapted for use in MCU 10 of FIG. 1 in accordance with a preferred embodiment of the present invention. The call error prevention method of the present invention may be generally implemented using the following functional steps:

I. The user gets ready to place a telephone call by way of MCU 10, "start" step 30.

II. The user inputs a telephone number via keypad 24 (FIG. 1) and presses the "SEND" button (not shown) on keypad 24, step 32. A person skilled in the art would instantly recognize that the "call send" functionality of MCU 10 may be implemented in a variety of ways depending on the particular MCU architecture with the inclusion of a "SEND" button being just one of many such implementations. The input telephone number is stored in memory module 28 (FIG. 1) and displayed for the user via display 26 (FIG. 1) by controller 22 (FIG. 1).

III. Controller 22 checks with memory module 28 whether the input telephone number is a recognizable specific telephone service code, step 34. Such a code may be, for example, "411", "611", or the like. If controller 22 determines that the input telephone number is not a recognizable specific telephone service code, controller 22 is adapted to connect the call via RF transceiver 12 (FIG. 1) and antenna 14 (FIG. 1), step 40.

IV. If controller 22 determines that the input telephone number is a recognizable specific telephone service code, controller 22 is adapted to check with memory module 28 whether the input telephone number contains the same number of digits as the recognized specific telephone service code, step 36. If controller 22 determines that there is no mismatch in the number of digits, controller 22 is adapted to connect the call via RF transceiver 12 and antenna 14, step 40.

V. If controller 22 determines that there is a mismatch in the number of digits, controller 22 instructs VPM 16 (FIG. 1) and/or display 26 (FIG. 1) to generate an appropriate user input error warning, step 38. For example, VPM 16 may produce an audible warning to the user by way of speaker 20 (FIG. 1), and/or a visible user warning may be shown on display 26 (FIG. 1). Other types of warning may be generated for the user as long as such other warnings do not depart from the intended purpose of the present invention. To correct the call error, the user may re-input the telephone number, as generally shown in FIG. 2.

Figure 3:
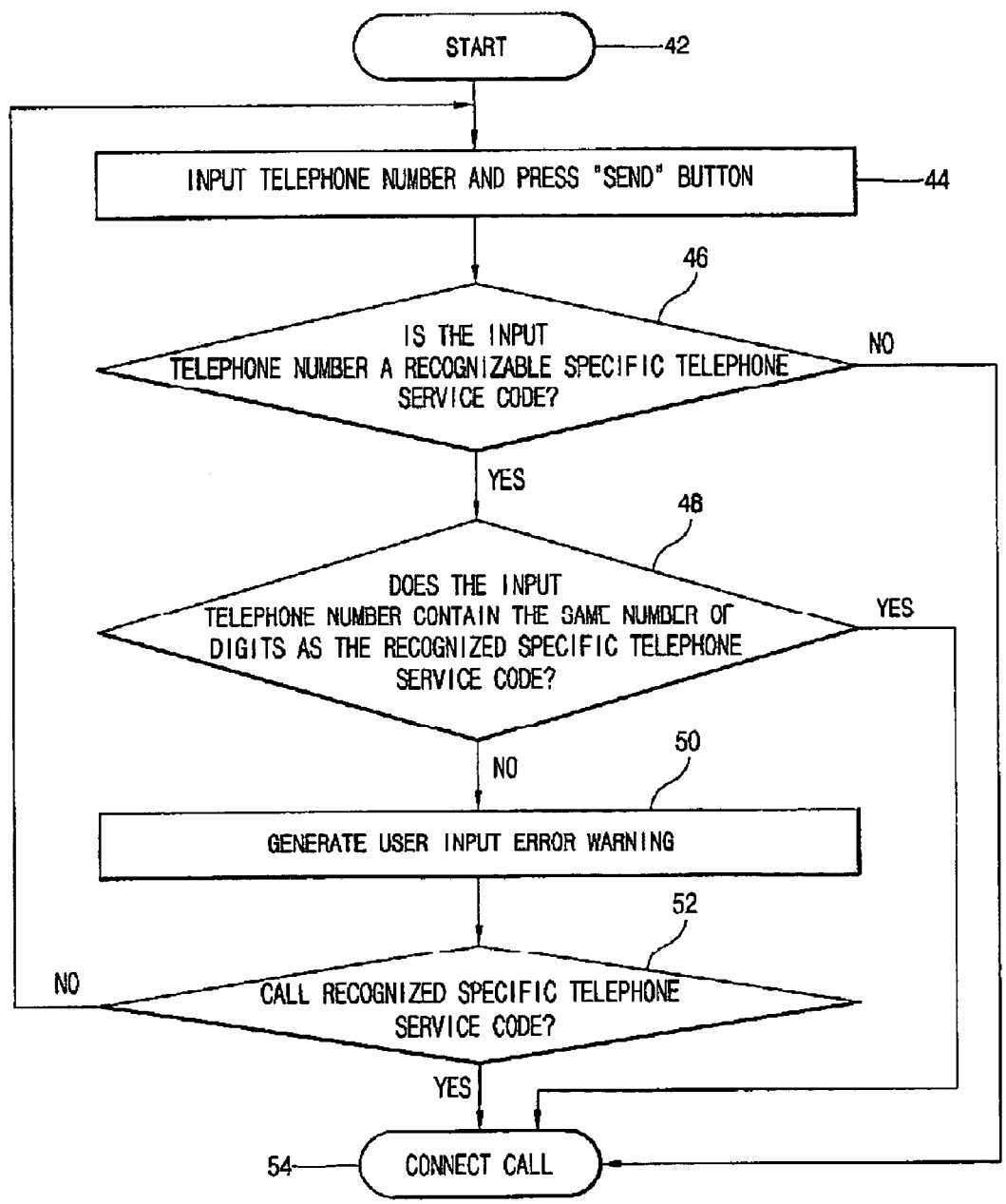
FIG. 3 is a flowchart of a call error prevention method adapted for use in the mobile communication unit of FIG. 1 in accordance with another embodiment of the present invention.

FIG. 3 is a flowchart of a call error prevention method adapted for use in MCU 10 of FIG. 1 in accordance with another preferred embodiment of the present invention. The call error prevention method of the present invention may be generally implemented using the following functional steps:

I. The user gets ready to place a telephone call by way of MCU 10, "start" step 42.

II. The user inputs a telephone number via keypad 24 (FIG. 1) and presses the "SEND" button (not shown) on keypad 24, step 44. A person skilled in the art would instantly recognize that the "call send" functionality of MCU 10 may be implemented in a variety of ways depending on the particular MCU architecture with the inclusion of a "SEND" button being just one of many such implementations. The input telephone number is stored in memory module 28 (FIG. 1) and displayed for the user via display 26 (FIG. 1) by controller 22 (FIG. 1).

III. Controller 22 checks with memory module 28 whether the input telephone number is a recognizable specific telephone service code, step 46. Such a code may be, for example, "411", "611", or the like. If controller 22 determines that the input telephone number is not a recognizable specific telephone service code, controller 22 is adapted to connect the call via RF transceiver 12 (FIG. 1) and antenna 14 (FIG. 1), step 54.

IV. If controller 22 determines that the input telephone number is a recognizable specific telephone service code, controller 22 is adapted to check with memory module 28 whether the input telephone number contains the same number of digits as the recognized specific telephone service code, step 48. If controller 22 determines that there is no mismatch in the number of digits, controller 22 is adapted to connect the call via RF transceiver 12 and antenna 14, step 54.

V. If controller 22 determines that there is a mismatch in the number of digits, controller 22 instructs VPM 16 (FIG. 1) and/or display 26 (FIG. 1) to generate an appropriate user input error warning, step 50. For example, VPM 16 may produce an audible warning to the user by way of speaker 20 (FIG. 1), and/or a visible user warning may be shown on display 26 (FIG. 1). Other types of warning may be generated for the user as long as such other warnings do not depart from the intended purpose of the present invention.

VI. Thereafter, or in conjunction with the previous step, controller 22 checks with the user via display 26 and/or VPM 16 and speaker 20 whether the user would like to call the recognized specific telephone service code, step 52. If the user responds in the affirmative, e.g. via keypad 24 or microphone 18, controller 22 connects the call via RF transceiver 12 and antenna 14, step 54. If the user responds in the negative via keypad 24 or microphone 18, controller 22 directs the user via display 26 and/or VPM 16 and speaker 20 to start from the beginning, i.e. to re-input the correct telephone number, as generally illustrated in FIG. 3.

Figure 4:
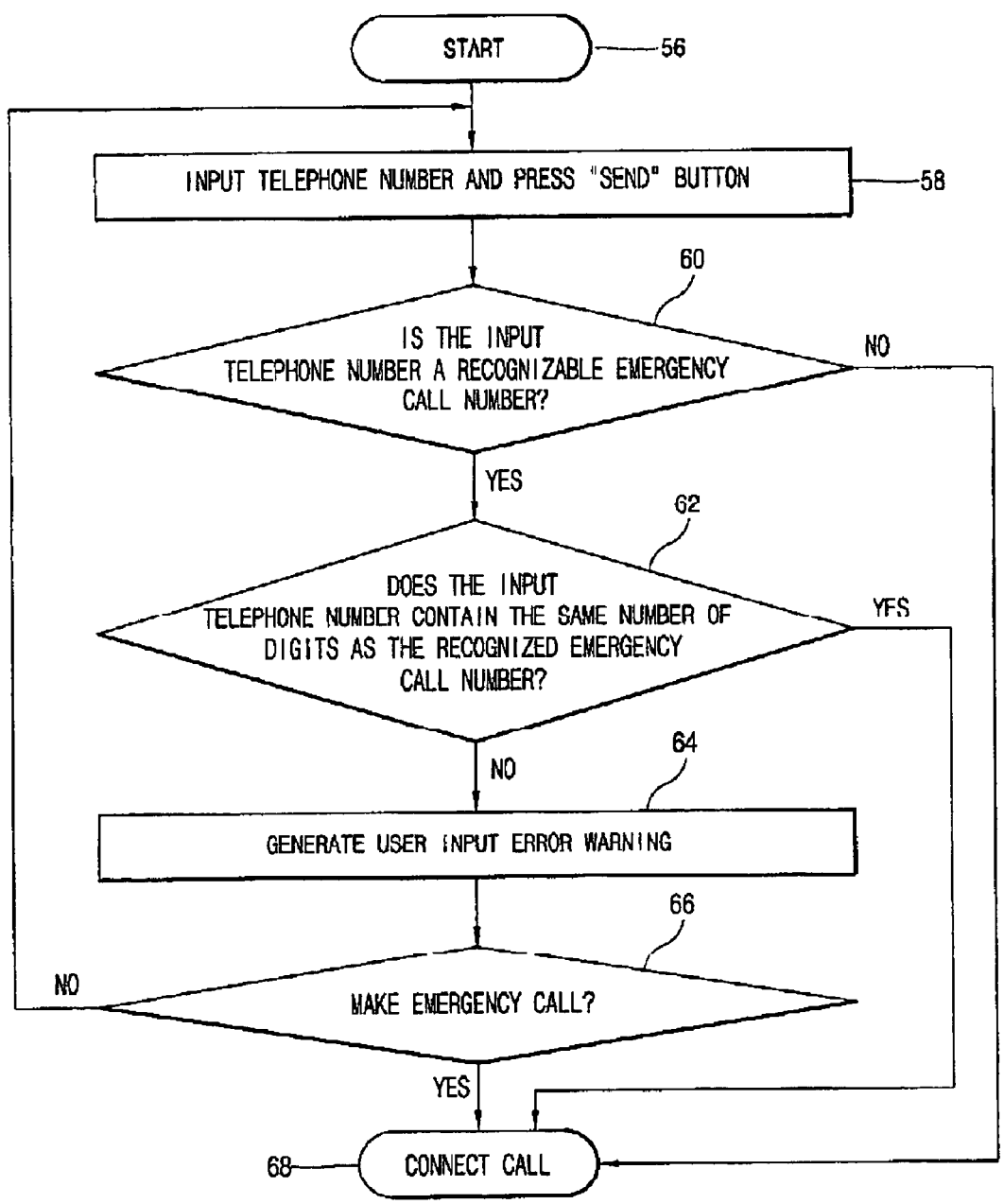
FIG. 4 is a flowchart of a call error prevention method adapted for use in the mobile communication unit of FIG. 1 in accordance with yet another embodiment of the present invention.

FIG. 4 is a flowchart of a call error prevention method adapted for use in MCU 10 of FIG. 1 in accordance with yet another preferred embodiment of the present invention. The call error prevention method of the present invention may be generally implemented using the following functional steps:

I. The user gets ready to place a telephone call by way of MCU 10, "start" step 56.

II. The user inputs a telephone number via keypad 24 (FIG. 1) and presses the "SEND" button (not shown) on keypad 24, step 58. A person skilled in the art would instantly recognize that the "call send" functionality of MCU 10 may be implemented in a variety of ways depending on the particular MCU architecture with the inclusion of a "SEND" button being just one of many such implementations. The input telephone number is stored in memory module 28 (FIG. 1) and displayed for the user via display 26 (FIG. 1) by controller 22 (FIG. 1).

III. Controller 22 checks with memory module 28 whether the input telephone number is a recognizable emergency call number, step 60. Memory module 28 contains pre-stored emergency call numbers which may be general emergency numbers such as "911" or "119" in the United States or South Korea, respectively, or the emergency telephone number to a local police or sheriff's station, the telephone number to a local poison control center, the telephone number to the nearest fire department station, or the like. If controller 22 determines that the input telephone number is not a recognizable emergency call number, controller 22 is adapted to connect the call via RF transceiver 12 (FIG. 1) and antenna 14 (FIG. 1), step 68.

IV. If controller 22 determines that the input telephone number is a recognizable emergency call number, controller 22 is adapted to check with memory module 28 whether the input telephone number contains the same number of digits as the recognized emergency call number, step 62. If controller 22 determines that there is no mismatch in the number of digits, controller 22 is adapted to connect the call via RF transceiver 12 and antenna 14, step 68.

V. If controller 22 determines that there is a mismatch in the number of digits, controller 22 instructs VPM 16 (FIG. 1) and/or display 26 (FIG. 1) to generate an appropriate user input error warning, step 64. For example, VPM 16 may produce an audible warning to the user by way of speaker 20 (FIG. 1), and/or a visible user warning may be shown on display 26 (FIG. 1). Other types of warning may be generated for the user as long as such other warnings do not depart from the intended purpose of the present invention.

VI. Thereafter, or in conjunction with the previous step, controller 22 checks with the user via display 26 and/or VPM 16 and speaker 20 whether the user would like to call the recognized emergency call number, step 66. If the user responds in the affirmative, e.g. via keypad 24 or microphone 18, controller 22 connects the call via RF transceiver 12 and antenna 14, step 68. If the user responds in the negative via keypad 24 or microphone 18, controller 22 directs the user via display 26 and/or VPM 16 and speaker 20 to start from the beginning, i.e. to re-input the correct telephone number, as generally illustrated in FIG. 4.

For example, if a user attempts to place a telephone call to 011-2345-6789 in South Korea using a wireless MCU which lacks the inventive functionality described hereinabove by erroneously dialing 112-3456-789 on the MCU keypad, an unwarranted emergency call would be automatically made to the (South Korean) "112" crime report center. As a result, the user may be fined by the authorities for frivolous use of the "112" crime report telephone number. If, however, a user were to erroneously dial 112-3456-789 instead of 011-2345-6789 in South Korea using a wireless MCU equipped with the inventive functionality described hereinabove, the MCU would automatically recognize the "112" crime report number and consult with the user regarding placement of the recognized emergency crime report telephone call, i.e. an emergency call error would be readily prevented.

A person skilled in the art would recognize that the above-described novel call error prevention functionality is not restricted to wireless MCUs, but may be easily implemented in landline communication units as well. A person skilled in the art would also recognize that the call error prevention functionality may be implemented in hardware and/or software form. Other components and/or configurations may be utilized in the above-described embodiments.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

While the present invention has been described in detail with regards to several embodiments, it should be appreciated that various modifications and variations may be made in the present invention without departing from the scope or spirit of the invention. In this regard it is important to note that practicing the invention is not limited to the applications described hereinabove. Many other applications and/or alterations may be utilized provided that such other applications and/or alterations do not depart from the intended purpose of the present invention. Also, features illustrated or described as part of one embodiment can be used in another embodiment to provide yet another embodiment such that the features are not limited to the embodiments described above. Thus, it is intended that the present invention cover all such embodiments and variations as long as such embodiments and variations come within the scope of the appended claims and their equivalents.

What is claimed is:

1. A call error prevention method, said method comprising:
receiving digits comprising a call number;
receiving a call send signal to indicate the call number is complete;
upon receiving the call send signal, determining whether the call number contains the same number of digits as a recognized call service code;
generating an input error warning if the call number starts with the recognized call service code and if the call number does not contain the same number of digits as the recognized call service code;
requesting a confirmation signal that the call number is a correct number when the input error warning is generated; and transmitting the call number to a communication network for placing the call if the call number contains the same number of digits as the recognized call service code, or after requesting the confirmation signal, the confirmation signal is received.

2. The call error prevention method of claim 1, further comprising transmitting the call number to a communication network for placing the call if the call number does not start with the recognized call service code.

3. The call error prevention method of claim 1, further comprising receiving again the call number to correct a call error.

4. A call error prevention method, said method comprising:
providing digits comprising a call number;
providing a call send signal to indicate the call number is complete;
checking whether the digits of the call number is start with a recognized emergency call number;
determining whether the call number contains the same number of digits as the recognized emergency call number; and
generating an input error warning if the call number starts with the recognized emergency call number and if the call number does not contain the same number of digits as the recognized emergency call number;

requesting a confirmation signal that the call number is a correct number when the input error warning is generated; and transmitting the call number to a communication network for placing the call if the call number contains the same number of digits as the recognized call service code, or after requesting the confirmation signal, the confirmation signal is received.

5. The call error prevention method of claim 4, further comprising transmitting the call number to a communication network for placing the call if the call number does not start with the recognized emergency call number.

6. The call error prevention method of claim 4, further comprising transmitting the call number to a communication network for placing the call if the call number contains the same number of digits as the recognized emergency call number.

7. The call error prevention method of claim 4, further comprising receiving again the call number to correct a call error.

8. A communication unit adapted to check a call number against a plurality of recognized call service codes, determine whether the call number starts with one of the plurality recognized of call service codes and whether the call number contains the same number of digits as the one of the plurality of recognized call service codes, generate an input error warning if there is a mismatch in the number of digits between the call number and the one of the plurality of recognized call service codes, and request a confirmation that the call number is a correct number when the input error warning is generated; and transmit the call number to a communication network for placing the call if the call number contains the same number of digits as the recognized call service code, or after requesting the confirmation signal, the confirmation signal is received.

9. A communication unit adapted to check a call number against a plurality of recognized emergency call numbers, determine whether the call number starts with one of the plurality of recognized emergency call numbers and whether the call number contains the same number of digits as the one of the plurality of recognized emergency call numbers, generate an input error warning if there is a mismatch in the number of digits between the call number and the one of the plurality of recognized emergency call numbers, and request a confirmation that the call number is a correct number when the input error warning is generated; and transmit the call number to a communication network for placing the call if the call number contains the same number of digits as the recognized call service code, or after requesting the confirmation signal, the confirmation signal is received.

10. The call error prevention method of claim 4, further comprising transmitting the call number to a communication network for placing the call if, after requesting the confirmation signal, the confirmation signal is provided.

* * * * *